United States Patent [19]

Fischer

[11] Patent Number: 5,314,277
[45] Date of Patent: May 24, 1994

[54] EXPANSIBLE PLUG HAVING AN EXPANDER BODY

[75] Inventor: Artur Fischer, Waldachtal 3/Tumlingen, Fed. Rep. of Germany

[73] Assignee: fischerwerke Artur Fischer GmbH & Co. KG, Waldachtal 3/Tumlingen, Fed. Rep. of Germany

[21] Appl. No.: 25,621

[22] Filed: Mar. 2, 1993

[30] Foreign Application Priority Data

Mar. 13, 1992 [DE] Fed. Rep. of Germany ....... 4208016

[51] Int. Cl.$^5$ .............................................. F16B 13/06
[52] U.S. Cl. ......................................... 411/55; 411/44
[58] Field of Search ..................... 411/55, 32, 38, 44, 411/34

[56] References Cited

U.S. PATENT DOCUMENTS

| | | | |
|---|---|---|---|
| 2,685,221 | 8/1954 | Barrett | 411/55 |
| 4,287,807 | 9/1981 | Pacharis et al. | 411/55 X |
| 4,309,138 | 1/1982 | Jarman et al. | 411/55 |
| 4,656,806 | 4/1987 | Leibhard | 411/55 X |
| 4,986,711 | 1/1991 | Fischer | 411/55 |

FOREIGN PATENT DOCUMENTS

| | | |
|---|---|---|
| 0308594 | 3/1989 | European Pat. Off. |
| 3445713 | 6/1986 | Fed. Rep. of Germany |
| 3730211 | 3/1989 | Fed. Rep. of Germany |
| 476982 | 9/1915 | France |

Primary Examiner—Rodney M. Lindsey
Attorney, Agent, or Firm—Michael J. Striker

[57] ABSTRACT

The expansible plug has an expander body at one end of a plug shank and an expansible sleeve which slids over the expander plug in operation. A sliding ring is often provided between the expander body and the expansible sleeve to improve the sliding properties of the expansible sleeve over the expander plug. To prevent slippage of the sliding ring off the expander plug, the sliding ring can be provided with an interlocking inner profile which engages in an outer thread or a plurality of annular steps on the outer surface of the expander body. The expansible plug can be used to attach objects to a masonry wall by inserting the expansible plug into a drilled blind hole with the expander body at the base of the hole and a fixing means which may include a threaded portion on the shank protruding from the hole.

8 Claims, 3 Drawing Sheets

EXPANSIBLE PLUG HAVING AN EXPANDER BODY

BACKGROUND OF THE INVENTION

The invention relates to an expansible plug with an expander body and, more particularly, to an expansible plug with an expander body for anchoring an object such as a piece of timber to a wall.

EP-B-0 308 594 discloses an expansible plug having a conical expander body and a metallic expansible sleeve. The expander body is drawn into the metallic expansible sleeve in operation. To promote the sliding properties of the expansible sleeve in the region of the expander body, a sliding ring is provided in front of the expander body. As the expander body enters the expansible sleeve, the material of the sliding ring spreads so that a low-friction film forms in the vicinity of the conical expander body.

SUMMARY OF THE INVENTION

It is an object of the present invention to provide an expansible plug with an expander body and an expansible sleeve, in which the expansible sleeve slids more easily over the expander body than in the expansible plug of the prior art.

It is also an object of the present invention to provide an expansible plug including an expander body and expansible sleeve with an improved sliding ring to improve the sliding properties of the expansible sleeve over the expander body.

According to the invention, the expansible plug comprises a plug shank; an expander body having an outer surface, arranged at one end of the plug shank and widening toward a free end of the expander body; an expansible sleeve positioned on the plug shank so as to be engagable with the expander body; fixing means arranged at another end of the plug shank remote from the end of the plug shank provided with the expander body and a sliding ring having a conical outer face, an inner surface and arranged between the expander body and the expansible sleeve so that a conical inner face of the expansible sleeve fits closely against the conical outer face of the sliding ring. The inner surface of the sliding ring and the outer surface of the expander body are structured to interlock and fit together when the sliding ring is engaged with the expander body so that the sliding ring does not slip off the expander body in operation.

The expander body is advantageously arranged at one end of the plug shank and the fixing means is arranged at another end of the plug shank in the expansible plug according to the invention. The inner face of the expander sleeve on an end adjacent the sliding ring widens conically to fit the sliding ring. To provide the improved sliding properties the sliding ring is provided with an inner shape capable of interlocking with the expander body when the sliding ring is engaged with the expander body. The expander body has either an external thread or widens toward its free end in a series of steps.

The advantages of the invention are thus provided by an expander body having a discontinuous step-shaped external cross-section or a thread widening outwards in diameter. The sliding ring has a corresponding profile so that is fits in an interlocking manner on the expander body. As the expansible sleeve is pushed on the expander body or the expander body is drawn into the expansible sleeve, the sliding ring does not slip off and also the plastic material of the sliding ring is not compressed and squeezed away in some unknown way.

It is especially advantageous if the thickness of the material of the sliding ring in the vicinity of the outer edges of the individual annular steps is comparatively thin so that undesirable radial resilience is avoided. The expansible plug can therefore be clamped in a drilled hole by expanding the expansible sleeve with great expansion pressure against the wall of the hole drilled in masonry. The thickness of the material of the sliding ring is preferably equally small at all outer edges of the annular steps and may, for example, amount to less than one millimeter.

The sliding ring is advantageously manufactured from resilient plastic material. It is preferably provided with an elongate slit so that the sliding ring can be bent open and mounted laterally onto the expander body. Because of its resilience, the sliding ring then clamps onto the expander body.

The outer surface of the expander body is advantageously provided with a thread of increasing diameter or a series of annular steps for engagement with a corresponding inner surface of the sliding ring to provide a nonslip engagement of these two components.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE PREFERRED EMBODIMENT

Figure 1:
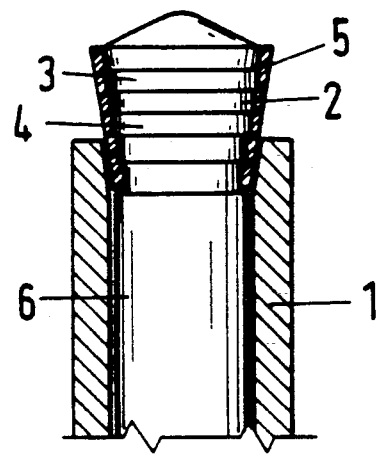
FIG. 1 is a detailed cross-sectional view of an expansible plug showing a sliding ring according to the invention.

The expansible sleeve 1 shown in the drawing in FIG. 1 can be part of a composite anchor which can be anchored by an adhesive introduced into a hole drilled in masonry. However, it may be part of an expansible plug which has an expansible sleeve 1 that is arranged to be driven on an expander body 2 and during that process is expanded sufficiently for the expansible plug to be clamped in a drilled hole. Furthermore, it is also possible for the expander body 2 to be drawn downwards into the expansible sleeve 1 so that it expands and becomes clamped in the drilled hole, as in the embodiment shown in FIG. 2.

The expansible plug shown in FIG. 1 has an expander body 2 having an outer surface 21 with several annular steps 3,4. A sliding ring 5 of a resilient plastic material having an inner surface 51 designed to interlock and fit the annular steps 3,4 is mounted on the expander body 2. The sliding ring 5 is slitted longitudinally so that it can be opened and put on the expander body 2 from the side. The expansible sleeve 1 is also provided with elongate slits, not visible in FIG. 1, so that the expansible sleeve 1 can be expanded as its is pushed onto the expander body 5.

The expansible sleeve 1 is positioned on the plug shank 6 so as to be engagable with the expander body 2. Only a part of the expansible sleeve 1 is shown in FIG. 1.

Figure 4:
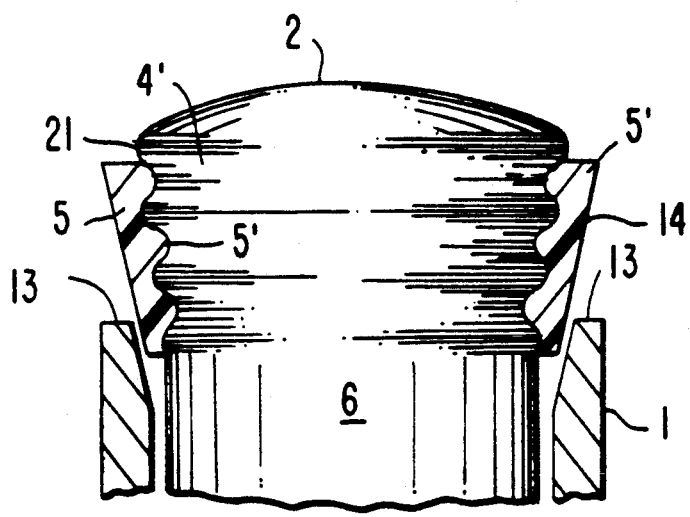
FIG. 4 is a detailed cross-sectional view of another embodiment of the expansible plug according to the invention in which the expander body has an external thread.

Alternatively in the embodiment of FIG. 4 the expander plug 2 can be provided with a thread 4' on its outer surface 21 which engages in a corresponding inner thread 5' on the opposing inner surface 51 of the sliding ring 5.

Figure 2:
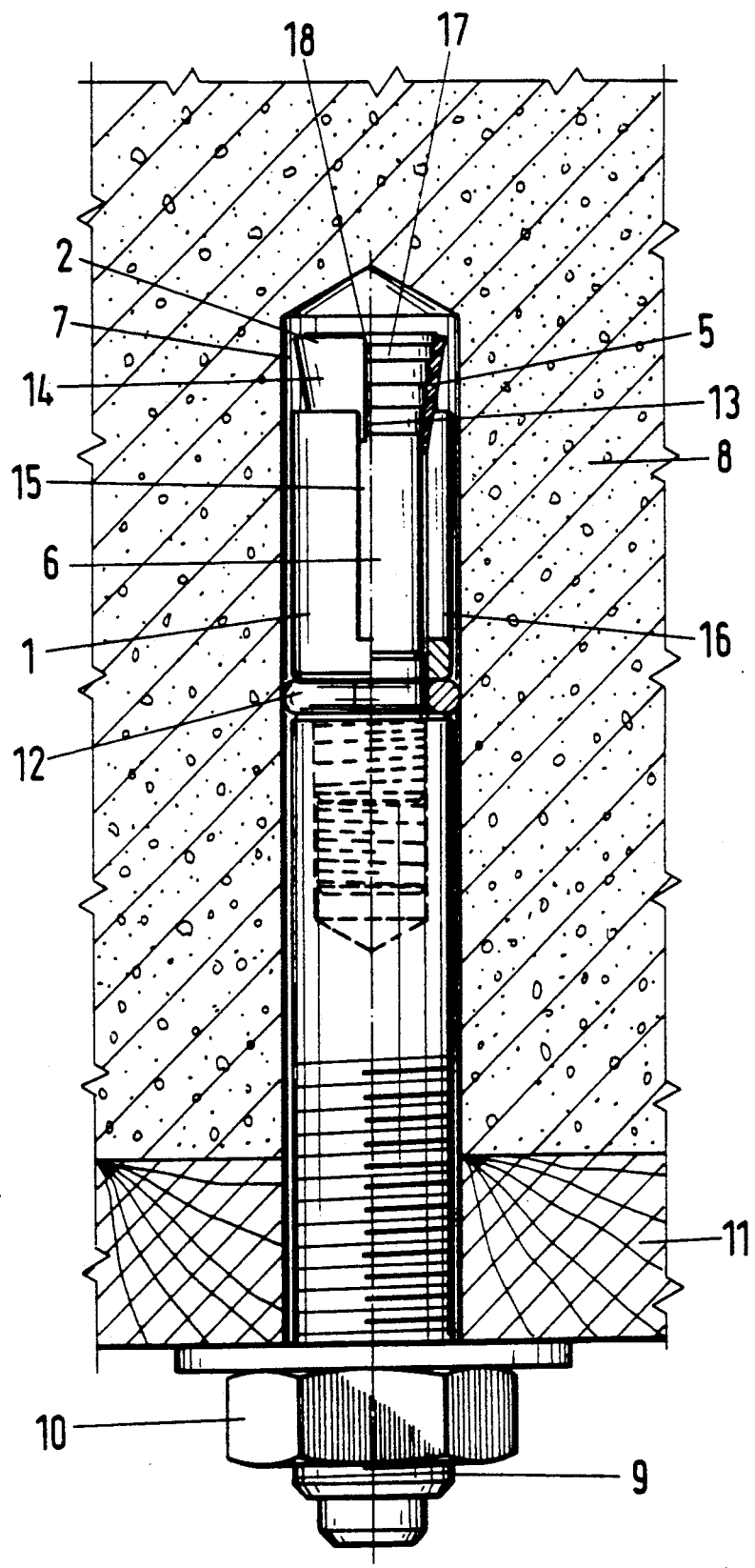
FIG. 2 is a cross-sectional view of an expansible plug according to the invention used as a fixing anchor mounted in a hole drilled in masonry shown prior to expansion of the expansible sleeve.

FIG. 2 shows an expansible plug according to the invention which has been inserted into a hole 7 drilled in masonry 8. At the outer end of the expansible plug, a screw nut 10 that is intended to fix a timber part 11 to the wall surface of the masonry 8 is screwed on a thread 9. The screw nut 10 and the thread 9 on the end of the shank remote from the expander body 2 provide a fixing means. For this purpose, the screw nut 10 must be tightened so that the plug shank 6 is drawn downwards and the expander body 2 enters the expansible sleeve 1. Because of the fixing ring 12, the expansible sleeve 1 remains fixedly positioned in the drilled hole 7 during the expansion process.

The sliding ring 5 reduces the friction between the expander body 2 and the expansible sleeve 1 during the expansion process, during which the conically widening inner face 13 of the expansible sleeve 1 fits closely against the conical outer face 14 of the sliding ring 5.

Figure 3:
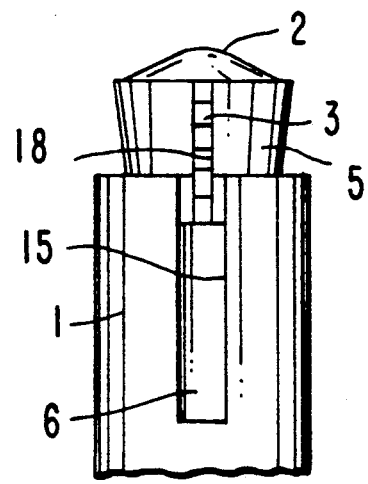
FIG. 3 is a side elevational view of the expansible plug of FIG. 2 showing the slits in the sliding ring and the expansible sleeve.

The elongate slits 15,16 of the expansible sleeve 1 can be seen partially in FIG. 2 and in FIG. 3.

Figure 5:
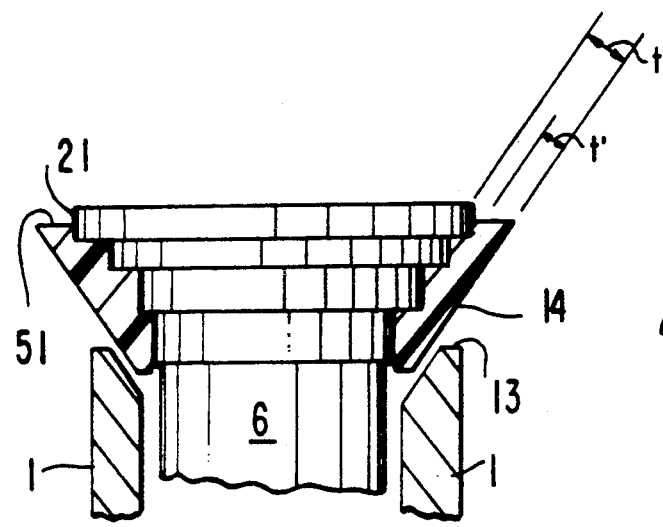
FIG. 5 is a detailed cross-sectional view of expansible plug of FIG. 2 showing thickness relationships of the sliding ring.

Like the sliding ring 5 illustrated in FIG. 1, the sliding ring 5 in FIG. 2 is also provided with a stepped internal surface 51 so that it does not slip off during operation. The thickness t' of the sliding ring 5 in FIG. 2 in the vicinity of the outer edges 17 of the sliding ring 5 is small compared to the maximum thickness t as seen in FIG. 5. The thickness t' may, for example, amount to just one millimeter, or even less. Furthermore, the sliding ring 5 is provided with a continuous elongate slit 18 as can be seen in FIGS. 2 and 3.

While the invention has been illustrated and embodied in an expansible plug in which the expander body slides more easily and reliably over the expansible sleeve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Expansible plug comprising
   a plug shank;
   an expander body having an outer surface, arranged at one end of the plug shank and widening toward a free end of the expander plug;
   an expansible sleeve having a conical inner face and positioned on the plug shank so as to be engagable with the expander body;
   fixing means arranged at another end of the plug shank remote from said end of said plug shank provided with said expander body;
   a sliding ring having a conical outer face and an inner surface, said sliding ring being positioned between the expander body and the expansible sleeve so that the conical inner face of the expansible sleeve fits closely against the conical outer face of the sliding ring, and
   interlocking means provided on the inner surface of the sliding ring and the outer surface of the expander body for interlocking said sliding ring and said expander body when the sliding ring is engaged with the expander body so that the sliding ring does not slip off the expander body when the expansible sleeve is slid over the expander body and the sliding ring.

2. Expansible plug as defined in claim 1, wherein said interlocking means comprises a thread of increasing diameter provided on said outer surface of said expander body.

3. Expansible plug as defined in claim 1, wherein said interlocking means comprises a plurality of annular steps in said outer surface of said expander body.

4. Expansible plug as defined in claim 1, wherein said fixing means comprises a threaded portion of said plug shank.

5. Expansible plug as defined in claim 3, wherein said sliding ring has a thickness which is the same at all outer edges of said annular steps.

6. Expansible plug as defined in claim 1, wherein said sliding ring has a continuous elongate slit.

7. Expansible plug as defined in claim 1, wherein said sliding ring is made of plastic.

8. Expansible plug as defined in claim 3, wherein the annular steps have outer edges and the sliding ring has a thickness in the vicinity of said outer edges smaller than a maximum thickness of said sliding ring.

* * * * *